(12) United States Patent
Natanzon et al.

(10) Patent No.: US 11,550,669 B2
(45) Date of Patent: *Jan. 10, 2023

(54) TIME BASED SLA COMPLIANCE FOR DISASTER RECOVERY OF BUSINESS CRITICAL VMS

(71) Applicant: EMC IP Holding Company LLC, Hopkinton, MA (US)

(72) Inventors: Assaf Natanzon, Tel Aviv (IL); David Zlotnick, Tel Aviv (IL); Boris Shpilyuck, Ashdod (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/130,903

(22) Filed: Dec. 22, 2020

(65) Prior Publication Data

US 2021/0109821 A1   Apr. 15, 2021

Related U.S. Application Data

(63) Continuation of application No. 16/391,156, filed on Apr. 22, 2019, now Pat. No. 10,936,440.

(51) Int. Cl.
*G06F 11/14* (2006.01)
*G06F 9/455* (2018.01)
*H04L 67/1095* (2022.01)
*H04L 41/5025* (2022.01)

(52) U.S. Cl.
CPC ...... *G06F 11/1464* (2013.01); *G06F 9/45558* (2013.01); *H04L 41/5025* (2013.01); *H04L 67/1095* (2013.01); *G06F 2009/45575* (2013.01)

(58) Field of Classification Search
CPC ............ G06F 11/1464; G06F 9/45558; G06F 2009/45575; H04L 41/5025; H04L 67/1095
See application file for complete search history.

(56) References Cited

U.S. PATENT DOCUMENTS

| | | | |
|---|---|---|---|
| 7,694,088 B1 * | 4/2010 | Bromley | G06F 11/1451 711/162 |
| 7,941,619 B1 * | 5/2011 | Rossi | G06F 11/1458 707/625 |
| 10,331,524 B2 | 6/2019 | Formato et al. | |
| 10,656,876 B1 | 5/2020 | Guturi et al. | |
| 2006/0274662 A1 * | 12/2006 | Tannenbaum | H04L 41/022 370/242 |
| 2009/0193064 A1 | 7/2009 | Chen et al. | |
| 2012/0089572 A1 | 4/2012 | Raichstein et al. | |
| 2014/0101113 A1 * | 4/2014 | Zhang | G06F 16/1748 707/E17.002 |

(Continued)

*Primary Examiner* — Prasith Thammavong
(74) *Attorney, Agent, or Firm* — Workman Nydegger

(57) ABSTRACT

One example method includes receiving data segments that are not already part of a full disk image of a backup, storing the data segments in storage, determining whether or not an aggregate total of data segments in the storage, that are not already part of a full disk image of a backup, equals or exceeds a threshold, when the aggregate total of data segments in the storage equals or exceeds the threshold, creating a full disk image of a backup that includes the data segments in storage, and storing the created full disk image of the backup to a recovery disk.

20 Claims, 5 Drawing Sheets

(56) References Cited

U.S. PATENT DOCUMENTS

| | | |
|---|---|---|
| 2019/0073378 A1 | 3/2019 | Guturi et al. |
| 2019/0179710 A1 | 6/2019 | Derryberry |
| 2019/0179918 A1* | 6/2019 | Singh .................. G06F 16/128 |
| 2019/0213089 A1 | 7/2019 | Podge et al. |
| 2020/0150897 A1 | 5/2020 | Guturi et al. |

* cited by examiner

TIME BASED SLA COMPLIANCE FOR DISASTER RECOVERY OF BUSINESS CRITICAL VMS

FIELD OF THE INVENTION

Embodiments of the present invention generally relate to data protection. More particularly, at least some embodiments of the invention relate to systems, hardware, software, computer-readable media, and methods for creating and implementing a disaster recovery (DR) process using pre-created VM recovery disks only for selected backup copies.

BACKGROUND

Enterprises may generate significant amounts of important data that is typically preserved in some type of data protection environment. Such data protection environments help to ensure that the data is recoverable in the event that a disaster occurs that compromises, or prevents access to, the data. Thus, disaster recovery is a critical process for organizations. One important parameter of a disaster recovery (DR) plan is the time it takes to recover after an incident such as the loss or corruption of data.

One approach to performing DR in a data protection environment that could be employed would be to use an auxiliary restore VM to perform the actual DR activity. Such an auxiliary restore VM could create disks of the same sizes as the disks of the protected VM of the customer, read the segmented backup copies data from storage and fill the disks with the relevant segmented data. After the disks are created and filled with relevant data, a new VM would be launched with those disks and the DR process would be completed. Such an approach presents problems however.

For example, if the VM to be restored is relatively large, the process of filling disks with relevant data may take a significant amount of time. This is because the data is uploaded to the storage environment broken into small pieces, or segments, in order to be able to transfer, for each new backup, only the new or updated segments. The segments that have not been changed since the last backup will not be added to the new backup copy. In particular, when performing DR with respect to a specific backup copy, all the relevant segments should be found in that backup copy, or in previous ones, and then each segment would be written to the correct offset on the target disk. While such an approach can save space in the storage environment, and also time in the creation of backup copies, this approach can nonetheless be expected to impose a significant cost when the time comes to perform a DR process.

This time penalty may be avoided or reduced in some instances, such as where a relatively longer RTO (Recovery Time Objective) time to DR completion may be acceptable for certain non-critical VMs. For other VMs, the recovery disks can be created and filled with data upon creation of a new backup copy. By performing this process in advance of a DR process, the disks are ready ahead of time, thereby reducing the RTO. That is, when the DR process is executed, the recovery disks already exist and so the DR process can be performed relatively quickly. However, creating full disks for each backup copy is costly and impractical, inasmuch as this effort requires significant storage space, and may also require significant processing time and resources.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
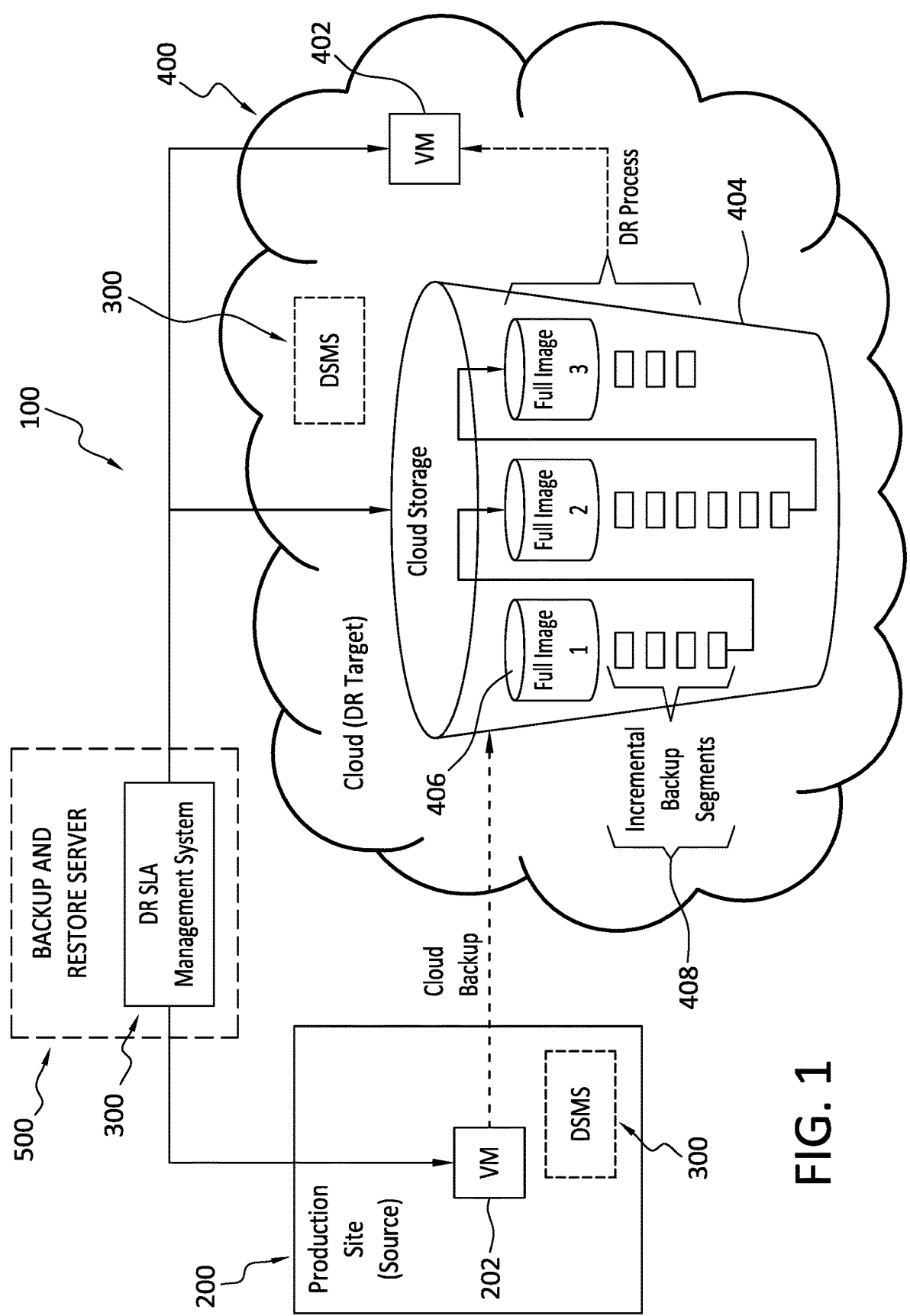
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods for creating and implementing a disaster recovery (DR) process using pre-created VM recovery disks only for selected backup copies. At least some embodiments of the invention are implemented in a cloud storage environment, such as a cloud datacenter for example, although the scope of the invention is not limited to this example environment.

In general, example embodiments of the invention can, with respect to a given DR process of a customer, intelligently pre-create disks only when needed and only for some selected customer backup copies, while still meeting the customer service level agreement (SLA) for that DR for any backup copy of that customer. In this way, example embodiments of the invention provide a reliable way to meet the DR time as defined in the SLA, while also saving money for customers and simplifying DR operation. For example, this approach will help keep storage space use to a minimum since only some recovery disks are created and, thus, storage space for a full set of recovery disks is not needed. This relative reduction in storage space consumption corresponds to a relative reduction in storage cost incurred by the customer. As well, because the recovery disks are pre-created, that is, the recovery disks are created prior to performance of the customer DR process, the amount of time needed to implement the DR process with respect to the customer disks is reduced as well.

In more detail, example embodiments of the invention determine the number of data segments that can be processed per unit of time by a storage environment such as a cloud datacenter, where the processing refers to the number of data segments that can be located and written to the correct offset at a recovery disk. Then, based on the target DR time provided in the customer SLA, a determination is made as to the maximum number of new or modified segments, of one or more differential backups, that can be stored in the system since the last full disk backup, without requiring a new full disk backup.

Once this maximum number of segments is determined, the system will generate new full disk copies only when the cumulative number of new or modified segments created since the last full disk copy exceeds the maximum number of segments. In this way, the customer is assured that when a DR process is performed, the new and modified segments that are not already included in a full disk copy can all be written to the recovery disk(s) within the time allotted by the SLA, given the processing capacity of the storage environment.

To make storage usage more efficient, full disk images can be kept as snapshots. Thus, at least some embodiments provide for storing only the differential when the images are on Amazon Elastic Block Storage (EBS) or other block storage in a cloud storage environment.

Advantageously then, some embodiments of the invention may provide various benefits and improvements relative to the configuration and operation of conventional hardware, software, systems and methods. To illustrate, an embodiment of the invention may provide processes for predictable and reliable backup and DR operations. As another example, and embodiment of the invention can help to ensure that DR operations are performed in a manner consistent with customer SLA requirements, including RTO. Further, an example embodiment of the invention provides for selectivity in terms of when a full disk copy will be pre-created. As another example, an embodiment of the invention can pre-create disks periodically with a larger interval between pre-creations and then, during DR, use those disks as basis for recovery and apply any remaining differentials, not already part of a full disk copy on a recovery disk, on top of the recovery disk(s).

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms, as well as the Dell-EMC RecoverPoint and the VMWare SRM (Site Recovery Manager) platforms.

A data protection environment may take the form of a public or private cloud storage environment, a customer on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients, and which performs disaster recovery (DR) operations including creating and writing to recovery disks.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments (or simply 'segments') such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In general, the example operating environment 100 in FIG. 1 is a data protection environment that comprises a production site 200, a DR SLA Management System (DSMS) 300, a datacenter 400, and a backup and restore server 500. The production site 200, which may take the form of an enterprise or organization premises for example, may include any number 'n' of VMs 202. In general, the VMs 202 may be involved in operations of computing systems and other systems at the production site.

As used herein, the term 'VM' is broad in scope and refers generally to a virtualized representation of any combination of hardware and/or software. The disclosed VMs are not limited to performance of any particular functionality or group of functionalities. Some example VMs in connection with which embodiments of the invention may be implemented are virtualizations of components that include, but are not limited to, file systems, applications, databases, disks, processors, storage elements, memory elements, software, hardware, and any combination of these.

In general, and as disclosed in more detail elsewhere herein, the DSMS 300 serves to perform, and/or direct the performance of, the various functions disclosed herein concerning the creation of recovery disks, storage of data on the recovery disks, and the performance of DR processes involving those recovery disks. As indicated in FIG. 1, various configurations of the DSMS 300 are possible.

For example, in one implementation, the DSMS 300 is implemented as a stand-alone service. As a stand-alone service, the DSMS 300 communicates with the production site 200, and the datacenter 400.

In still other embodiments, and as indicated in FIG. 1, the DSMS 300 can communicate with, or be integrated as an element of, a backup and restore service or application. The backup and restore service or application may be hosted on a backup and restore server 500 that communicates with the production site 200 and datacenter 400.

In still another alternative configuration, the datacenter 400 may host the DSMS 300. In this example, the DSMS 300 communicates internally with storage 404 of the datacenter 400, and also communicates with the production site 200.

With continued attention to FIG. 1, the datacenter 400 can include one or more recovery VMs 402. In general, the recovery VMs 402 may be created as part of a disaster recovery plan. As disclosed herein, the recovery VMs 402 may each include one or more recovery disks created by, or at the direction of, the DSMS 300. Thus, in the event of a problem with a VM 202 of the production site 200, a corresponding recovery VM 402 is instantiated at the datacenter 400. The recovery VM 402 may include one or more recovery disks pre-created by the DSMS 300.

As well, the datacenter 400 includes storage 404 that may comprise one or more full disk images 406, and one or more incremental backup segments 408. In general, and as disclosed in more detail herein, the full disk images 406 and/or the incremental backup segments 408 are used to populate one or more recovery disks of one or more recovery VMs 402. For example, prior to, during, and/or subsequent to, a DR process, one or more of the recovery disks of one or more recovery VMs 402 may include one or more full disk images 406, and/or one or more incremental backup segments 408. As indicated in FIG. 1, multiple full images may exist in the datacenter 400 at the same time. Finally, the datacenter 400 may, but is not required to, be a public cloud site such as Amazon AWS, Microsoft Azure, or Google Cloud.

With continued reference to the example arrangements disclosed in FIG. 1, it is noted that the DSMS 300, however and wherever embodied, can receive various inputs from a user and/or from other elements and components of the system 100. Such inputs can be of various types and forms and can be received by the DSMS 300 automatically, from a user, and/or pulled by the DSMS 300 from components and elements of the system 100, and example inputs include, but are not limited to: user input; datacenter 400 processing capabilities; customer SLA requirements including RTO; time units for segment processing rates; maximum number of segments that can be processed per time unit; backup amounts; cumulative new and modified segments stored since the last full backup; average segment size; and, the maximum amount of storage allowed to consumed by new and modified segments before a new full disk backup is created. Such input may, but need not necessarily, be provided by way of a user interface (UI), such as a graphical user interface (GUI), or command line interface (CLI), for example.

The DSMS 300 may also receive input from one or more computing system components including datacenters, production sites, servers, memory, storage, hardware, and software. In addition to receiving input, the DSMS 300 may, in connection with a DR process, also create and instantiate one or more recovery VMs 402. The creation and instantiation of the recovery VMs 402 may be performed by the DSMS 300 automatically, such as in response to an event that compromises one or more of the VMs 202 of the production site 200, or may be performed in response to input from a user or other administrator.

B. Aspects of an Example DR SLA Management System (DSMS)

Figure 2:
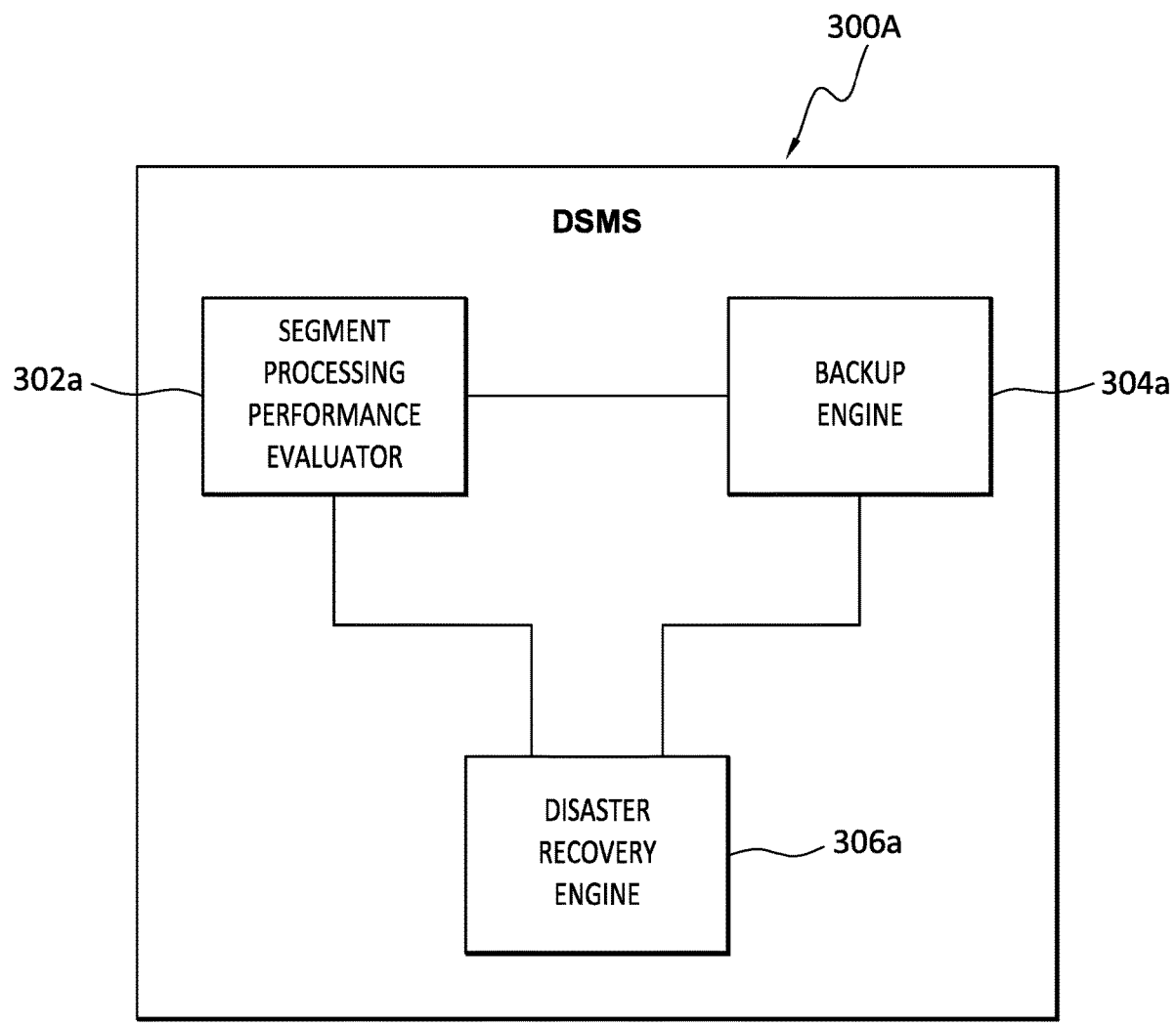
FIG. 2 discloses aspects of an example DR SLA Management System (DSMS).

With reference now to FIG. 2, further details are provided concerning a DSMS, one example of which is the DSMS 300a. The example DSMS 300a may include a variety of components, such as a segment processing performance evaluator module 302a. Among other things, the segment processing performance evaluator 302a will periodically measure the amount of segments that can be processed, by a datacenter 400 or other storage environment, per time unit (MSTU). The value of MSTU measured by the segment processing performance evaluator module 302a can be provided to other system components.

The example DSMS 300a may further include a backup engine 304a. The backup engine 304a may perform a variety of functions. For example, upon backup completion for specific VM 202 of a production site 200, the backup engine 304a will check the relevant current amount of segments (CAS) that reside in the system since the last full disk backup. As well, the backup engine 304a may determine, for one or more of the VMs 202, the maximum number of incremental backup segments (MS), and/or the maximum amount of memory that may be consumed by those incremental backup segments, that is supportable by the system before a full disk backup is required. That is, if CAS≥MS, then a full disk image will be created by the backup engine 304a. These maximum numbers are determined with reference to a customer required DR time specified in the customer SLA. As well, this calculation will be based in part on the MSTU value that is provided by the segments processing performance evaluator module 302a.

As further indicated in FIG. 2, the example DSMS 300a may also include a DR engine 306a that performs a variety of operations. For example, upon receipt of a DR request, such as from the production site 200 or a user, the DR engine 306a checks to determine if a full disk backup exists for each disk of the VM, such as the VM 202, identified in the DR request.

In operation, if a full backup for that VM exists, the DR engine 306a instantiates the recovery VM, such as the recovery VM 402, immediately with the full disk backup(s), and the DR operation is then completed. On the other hand, if a full disk backup does not exist for one or more disks of the VM(s) identified in the DR request, then the DR engine 306a will take the full disk image of the VM disk that is closest to the point in time (PIT) that is to be restored, and attach that full disk image to the recovery VM.

As used herein, the full disk image 'closest' to the point in time means that the number/amount of changes that need to be made to that full disk image to update it to the desired point in time is at a minimum relative to one or more other full disk images. Thus, it will be appreciated that the closest full disk image may have been created before the point in time, or the closest disk image may have been created after the point in time. In the former case, the full disk image can updated to the point in time by writing any incremental changes to that image that were made between the time the full disk image was created and the point in time. In the latter case, the full disk image can be rolled back to the point in time by reversing any incremental changes that were made to that full disk image between the time the full disk image was created and the point in time.

To illustrate with an example, if there is a first full disk image created before the PIT, and a second full disk image created after the PIT, the particular full disk image to be attached to the recovery VM can be selected based on the relative amount of changes that would be needed to restore that full disk image to the PIT. Thus, if the second full disk image could be restored to the PIT by deleting 4 Gb of data segments from the second full disk image, and the first full disk image could be restored to the PIT by writing 8 Gb of data segments, then it may be preferable, in terms of speed at least, to roll back the second full disk image to the PIT, rather than updating the first full disk image to the PIT, since it may be faster to delete 4 Gb than to write 8 Gb.

After attachment of the closest full disk image to the recovery VM, and when the closest full disk image pre-dates the point in time, the recovery VM then reads the segmented backup copies data from cloud storage and will write those to the correct offsets at the corresponding recovery disk. The segments that are read from storage and written to disks are those segments that have been stored since the time that the last full backup was created. The maximum number/storage amount of these segments is restricted by the backup engine 306a based on the requirements of the SLA. In particular, the time required for the datacenter to write those segments should not exceed the DR time SLA requested by the customer.

C. Example Host and Server Configurations

Figure 3:
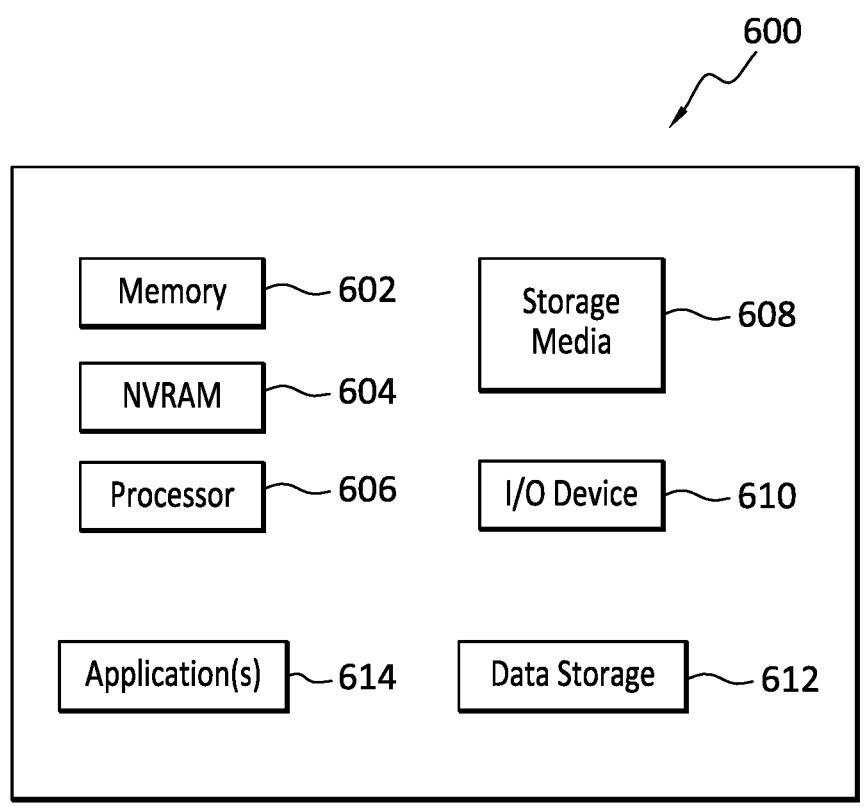
FIG. 3 discloses aspects of an example host configuration.

With reference briefly now to FIG. 3, any one or more of the production 200, VMs 202, DSMS 300, DSMS 300a, segment processing performance evaluator module 302a, backup engine 304a, disaster recovery engine 306a, datacenter 400, recovery VM 402, storage 404, and backup and restore server 500, can take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 2.

In the example of FIG. 2, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components 602 of the physical computing device 600 can take the form of solid state device (SSD) storage. As well, one or more applications 614 are provided that comprise executable instructions.

Such executable instructions can take various forms including, for example, instructions executable to perform any method or portion thereof disclosed herein, and/or executable by/at any of a storage site, whether on-premise at an enterprise, or a cloud storage site, client, datacenter, backup server, blockchain network, or blockchain network node, to perform functions disclosed herein. As well, such instructions may be executable to perform any of the other operations disclosed herein including, but not limited to, read, write, backup, storage, recovery, and restore, operations, segment number/memory calculation and determination operations, recovery disk creation, population, and instantiation operations, and segment storage operations.

D. Illustrative Example and Example Methods

Figure 4:
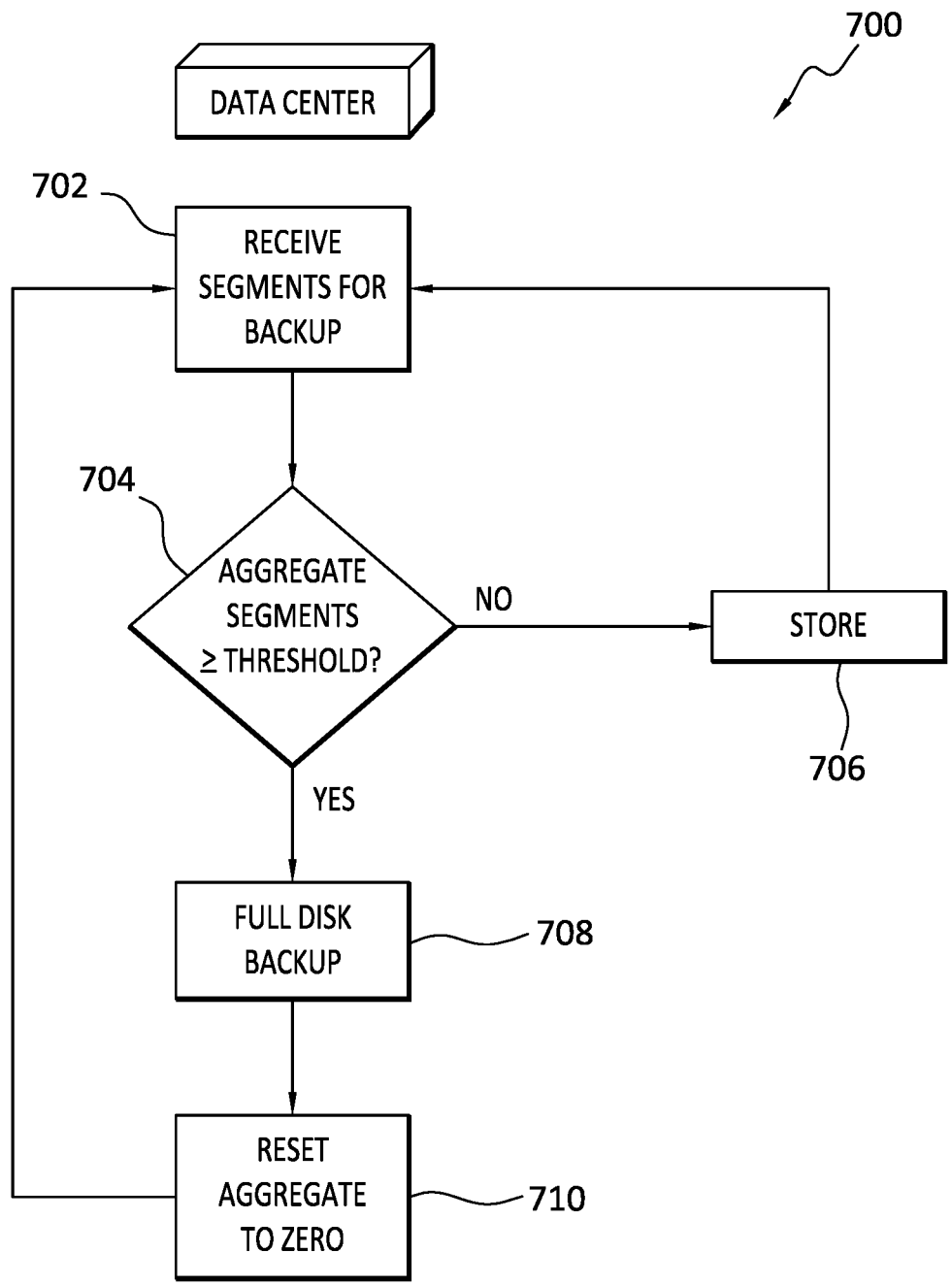
FIG. 4 is a flow diagram that discloses some general aspects of a method for processing data segments.
Figure 5:
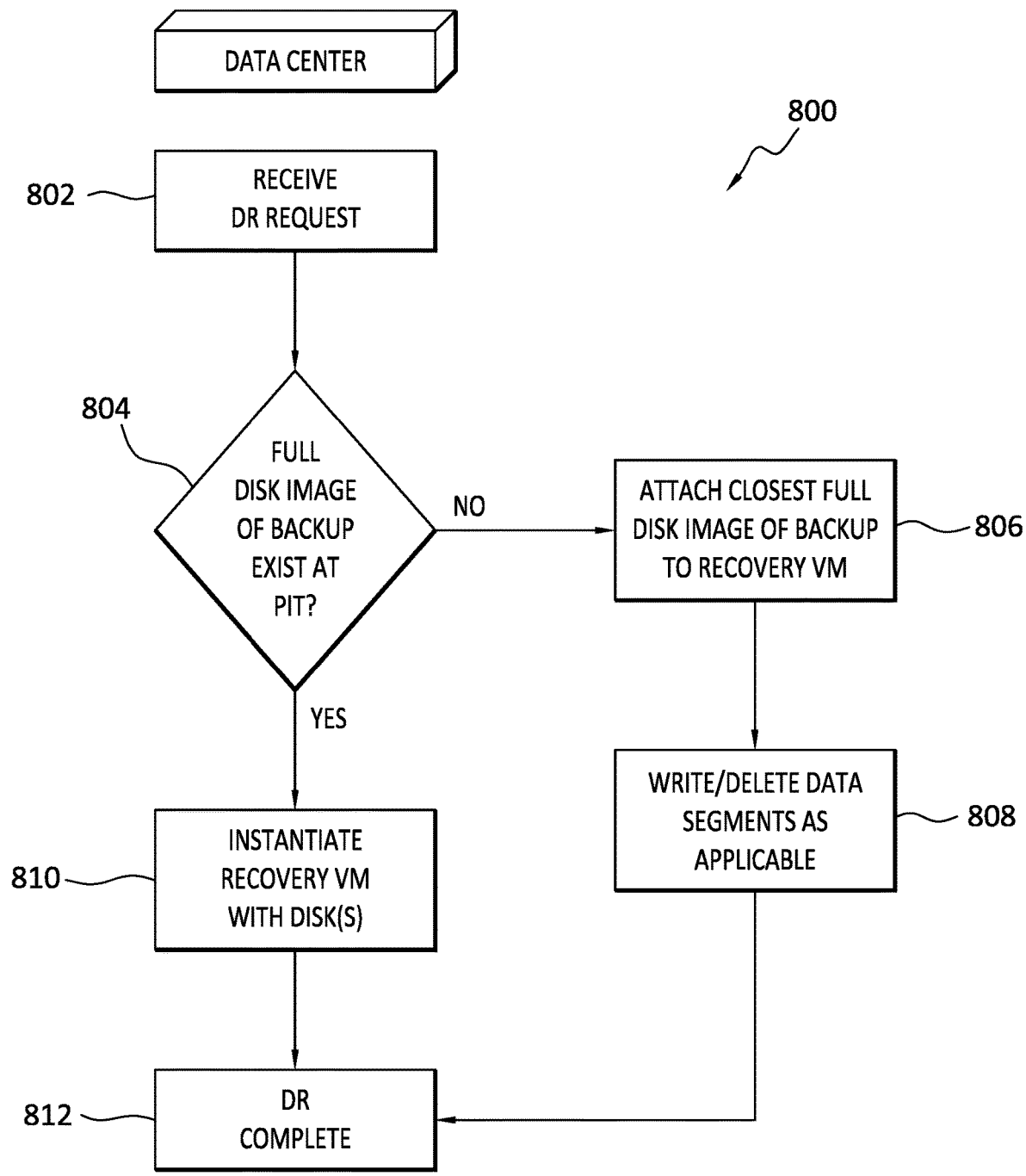
FIG. 5 is a flow diagram that discloses some general aspects of a method for performing disaster recovery.

With attention now to FIGS. 4 and 5, aspects of example methods for recovery disk creation for a recovery VM, and a DR process involving recovery of a VM including a recovery disk, are disclosed. Following is a discussion introducing some concepts relating to the respective methods of FIGS. 4 and 5.

The example begins with a definition of some terms. Particularly:
- a. let the customer required DR time SLA be S;
- b. let the time unit for which a segment processing rate is measured be T;
- c. let the maximum number amount of segments that can be processed per time unit be MSTU; and
- d. let the current number of segments stored in the system since the last full disk backup be CAS.

Based on the foregoing definitions, the maximum amount of segments (MS) that can be stored in the system since the last full disk backup, without violating customer required DR time SLA, can be calculated as:

$$MS=(S/T) \times MSTU$$

Upon finishing every backup, the current aggregate number of segments (CAS) residing in the system since last full disk's backup will be compared, such as by the DSMS, to the value of MS. And, if CAS≥MS, then a full disk backup should be created. On the other hand, if CAS<MS, then a full disk backup is not created. The following example is illustrative.

The following are assumed for the purposes of this illustrative example:
- a. customer DR time SLA (S) per specific VM is 30 minutes;
- b. time unit (T) is 10 minutes;
- c. segment size is 4 MB;
- d. the maximum number of segments that can be processed by the datacenter per time unit of 10 min (MSTU) is 4000 (thus, the total data that can be stored to a disk during 10 minutes is 4 MB×4000=16 GB); and e. Maximum number/allocated space for new/modified segments since last disk(s) pre-creation MS=S/T*MSTU=30/10*4000=12000 (thus, the total amount of data that can be written to a recovery disk within customer DR time SLA of 30 minutes is 4 MB*12000=48 GB)

As indicated in Table 1 below, it can be seen that on Day 1 for example, the aggregate amount of new/modified segments stored since the last full backup is 50 GB. However, since a maximum of 48 GB can be restored to a recovery disk within the time limit set in the customer SLA, that time limit would be exceeded if the system attempted to write 50 GB. Thus, a recovery disk with a full backup of the 50 GB of data must be pre-created.

After a full backup is created, the aggregate segment amount can then be reset to zero. Thus, on Day 2, segment data totaling 5 GB is stored, and so the aggregate amount of segments stored in the system becomes 5 GB. On Day 3, additional segment data totaling 1 GB is stored, and so the aggregate amount of segments stored in the system becomes 6 GB (5 GB from Day 1+1 GB from Day 2). This process continues until the aggregate amount of stored segment data becomes MS, which takes place on Day 10 when an additional 7 GB of segment data are stored, bringing the aggregate amount of stored segment data to 49 GB, which exceeds the allowable limit of 48 GB. Accordingly, and as indicated in Table 1, another disk should be pre-created with a backup of the 49 GB of segment data, and the aggregate segment amount again reset to zero.

With continued reference to Table 1, and also to FIG. 1, assume that a DR request is received on Day 11, and the preceding full disk (referred to as a "full image" in FIG. 1) backup occurred on Day 10. In this case, the 20 GB of segment data of day 11 is written to the recovery disk that includes the full image of Day 10. There is no need to write any other data to that recovery disk, since it now includes both the full image of Day 10, and the 20 GB of segment data from Day 11.

In this example, because (i) the full image from Day 10 already exists on the pre-created recovery disk, having been written on Day 10, (ii) only 20 GB of additional segment data from Day 11 is needed to be written to that pre-created recovery disk, and (iii) the customer SLA allows for time to write up to 48 GB, the DR process of writing 20 GB can be completed well within the time parameter set by the SLA. Thus, there is no need to perform a full backup to the recovery disk when the DR request is received and, accordingly, the DR process is performed more quickly than would be the case if a full backup was required to be written to the recovery disk. Moreover, the DR process is compliant with the time requirement imposed by the customer SLA.

As should be apparent from the aforementioned example, any of a variety of parameters can be adjusted to suit the requirements of a particular system, customer SLA, and other circumstances. For example, backups of segment data can be performed on regular and/or irregular time bases. Likewise, the amount of segment data backed up at any one time may be the same, or can vary. Further, any parameter of the customer SLA can be selected to have any particular value. The threshold of segment data needed to trigger creation of a pre-created disk with a full backup can be selected as needed. The time unit, segment size, and segment processing capacity can also be set as needed.

TABLE 1

| Day | Backup amount | Aggregate segments stored since last disk(s) pre-creation | Pre-create disk(s)? |
|---|---|---|---|
| 1 | 50 GB | 50 GB > 48 GB | Yes |
| 2 | 5 GB | 5 GB | |
| 3 | 1 GB | 6 GB | |
| 4 | 2 GB | 8 GB | |
| 5 | 12 GB | 20 GB | |
| 6 | 5 GB | 25 GB | |
| 7 | 6 GB | 31 GB | |
| 8 | 9 GB | 40 GB | |
| 9 | 2 GB | 42 GB | |
| 10 | 7 GB | 49 GB > 48 GB | Yes |
| 11 | 20 GB | 20 GB | |
| 12 | 13 GB | 33 GB | |
| 13 | 19 GB | 52 GB > 48 GB | Yes |

With the foregoing examples and discussion in view, details will now be provided concerning the example method 700 disclosed in FIG. 4. In general, the example method 700 is directed to the creation of one or more recovery disks for a recovery VM. Part, or all, of the method 700 may be performed automatically by, or at the direction of, a DSMS, examples of which are disclosed herein. In some embodiments, part, or all, of the method 700 is performed in a data protection environment, such as a cloud storage site. In some embodiments, part, or all, of the method 700 is performed automatically in response to a write request received from a component, such as a VM, of a production site.

The example method 700 can begin at 702 where new and/or modified data segments are received, such as at a datacenter, for backup. The new and/or modified data segments may be received 702 in connection with a write operation from an entity such as VM at a production site. Additionally, or alternatively, the new and/or modified data segments may be received 702 in connection with a backup operation performed by a backup and restore server.

Next, a determination is made 704 as to whether or not the aggregate amount of new/modified segment data, including the newly received data segments, exceeds an established threshold. As disclosed herein, this threshold can be specified as part of a customer SLA and refers to the total amount/size of new/modified data segments received for backup since the last full backup was performed. This amount can be measured in terms of the aggregate size, in GB for example, of the data segments, and/or the number of data segments received. Where the data segments are of a uniform size, either the aggregate size of data segments or the aggregate number of data segments can be used in defining the threshold.

If a determination is made 704 that the aggregate amount of new and modified data segments does not exceed the threshold, the newly received data segments are stored 706. In some embodiments, the newly received data segments are stored regardless of whether or not the threshold has been exceeded. Also, the newly received data segments can be stored before the determination 704 is made, or after the determination is made 704. In the example of FIG. 4, after the newly received data segments are stored 706, the method 700 returns to 702.

If it is determined 704 that the aggregate amount of new/modified segment data, including the newly received data segments, exceeds an established threshold, then the method 700 advances and a full disk backup is made 708. The full disk backup includes all of the data segments that have been aggregated since the last full backup, as well as the newly received 702 data segments. That is, a full image for a recovery disk, such as a VM recovery disk, is made. As explained elsewhere herein, such as in connection with the discussion of FIG. 5 for example, the full disk backup can be employed as part of a DR process. In some embodiments then, a full disk backup is not made unless/until an aggregate amount of data segments equals or exceeds an established threshold.

In this way, processing and storage resources are conserved and, as explained in the discussion of FIG. 5 for example, DR processes can be performed relatively more quickly than would be the case if full disk backups were not made until the DR process was begun. This approach may resolve one or more problems.

For example, during some weeks, the amount of new disk data may be relatively small and, as such, full disk creation would be a waste of storage, processing resources, and money. And, during other weeks, the amount of new data may be relatively large. Thus, relying on those weekly disk backups will prevent achievement of DR time SLA compliance. Because embodiments of the invention may provide for, at least, (i) creation of no more full disk backups than are needed, and (ii) compliance with customer SLA requirements, such embodiments may be effective in resolving both of the aforementioned problems.

With continued reference now to FIG. 4, after the full disk backup has been created 708, the method 700 may advance to 710 where the aggregate accumulated amount of data segments is reset to zero. After this reset 710, the method 700 may return to 702 where, again, new and/or modified data segments are received.

With reference now to FIG. 5, details are provided concerning methods for performing a DR process in connection with one or more pre-created disks, such as may be created by the method of FIG. 4. One example of such a DR process is generally denoted at 800 in FIG. 5.

The method 800 may begin when a DR request is received 802. The DR request can be received 802 from a production site, a user, or may be generated automatically upon detection of a problem at the production site. Among other things, the DR request identifies a particular point in time (PIT) to which a VM, for example, is to be restored. The PIT can be before, or after, creation of the closest full disk image, and there may be one or more full disk images on either side of the PIT.

After receipt of the DR request 802, a check is then performed 804 to determine whether or not a full backup of the disk(s) identified in the DR request exists at the PIT identified in the DR request. If the check 804 reveals that no full disk copy of the backup exists at the PIT, the method moves to 806 where the full disk backup copy closest to the PIT is identified and attached to the recovery VM. The closest full disk backup copy may pre-date the PIT, or may follow the PIT.

At 808, incremental data segments may be written to the recovery disk if it has been determined that the incremental data segments were written to storage after creation of the closest full disk copy but before the PIT. Alternatively, at 808, incremental data segments may be deleted from the recovery disk if it has been determined that the incremental data segments were written to storage after the PIT but before creation of the closest full disk copy. In this way, the closest full disk copy is rolled back to the PIT.

Thus, the DR request only requires that the new/modified data segments that were received before/after creation of the most recent full disk backup be written or deleted, as applicable, to/from the recovery disk 808. There is no need to create and write a full disk backup because that full disk backup was written to a pre-created disk, as explained in the example of FIG. 4, before the DR request was issued or received. Accordingly, once the new/modified data segments that were received after creation of the most recent full disk copy are written to, or deleted from, the recovery disk, the DR process is then complete 812.

If it is determined, again referring to 804, that a full disk backup exists at the PIT, and no new/modified data segments have been written since the time that full disk backup was created, the method advances and a recovery VM is instantiated 810 at the datacenter using the recovery disk(s) containing the full disk backup. No further recovery disk write operations are needed and the DR process is thus complete 812.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
   a segment processing performance evaluator module configured to determine a number of data segments that can be processed per unit of time by a storage environment that includes storage;
   a backup engine configured to determine, based on a target disaster recovery time that is a function of the number of data segments that can be processed per unit of time by the storage environment, a threshold defined as a maximum number of new or modified data segments of one or more differential backups that can be stored in storage, since a last full backup, without requiring a new full disk backup; and
   a disaster recovery engine configured to:
      determine whether or not an aggregate total of data segments in the storage, that are not already part of a full disk image of a backup, equals or exceeds the threshold;
      when the aggregate total of data segments in the storage equals or exceeds the threshold, create a full disk image of a backup that includes the data segments in storage; and
      store the created full disk image of the backup to a recovery disk.

2. The system as recited in claim 1, wherein the full disk image of the backup is created prior to issuance or receipt of a disaster recovery request.

3. The system as recited in claim 1, wherein the data segments that can be processed per unit of time comprise data segments that can be located and written to a correct respective offset at a recovery disk.

4. The system as recited in claim 1, wherein the aggregate total of data segments is either an aggregate number of data segments, or an aggregate size of the data segments.

5. The system as recited in claim 1, wherein when the aggregate total of data segments in the storage does not equal or exceed the threshold, creation of the full disk image of the backup is omitted.

6. The system as recited in claim 1, wherein the storage environment comprises a cloud storage site.

7. The system as recited in claim 1, wherein the system is hosted at a backup server.

8. The system as recited in claim 1, wherein when a problem occurs with a production VM, the system instantiates a recovery VM, and the recovery VM includes the recovery disk.

9. The system as recited in claim 1, wherein when a disaster recovery request is received by the system for a production site VM, and a full disk backup does not exist for a disk of the production site VM, the disaster recovery engine attaches, to a recovery VM, a full disk image of the VM disk that is closest to the point in time that is to be restored.

10. The system as recited in claim 9, wherein one or more incremental changes are written to, or undone from, the full disk image attached to the recovery VM.

11. The system as recited in claim 8, wherein the recovery VM is instantiated at a disaster recovery site.

12. The system as recited in claim 1, wherein the recovery disk further comprises one or more incremental backup segments.

13. The system as recited in claim 1, wherein the target disaster recovery time is specified by a customer service level agreement.

14. A non-transitory computer readable storage medium carrying instructions that are executable by one or more hardware processors, and the instructions comprise:
   a segment processing performance evaluator module configured to determine a number of data segments that can be processed per unit of time by a storage environment that includes storage;
   a backup engine configured to determine, based on a target disaster recovery time that is a function of the number of data segments that can be processed per unit of time by the storage environment, a threshold defined as a maximum number of new or modified data segments of one or more differential backups that can be stored in storage, since a last full backup, without requiring a new full disk backup; and
   a disaster recovery engine configured to:
      determine whether or not an aggregate total of data segments in the storage, that are not already part of a full disk image of a backup, equals or exceeds the threshold;
      when the aggregate total of data segments in the storage equals or exceeds the threshold, create a full disk image of a backup that includes the data segments in storage; and
      store the created full disk image of the backup to a recovery disk.

15. The non-transitory computer readable storage medium as recited in claim 14, wherein the full disk image of the backup is created prior to issuance or receipt of a disaster recovery request.

16. The non-transitory computer readable storage medium as recited in claim 14, wherein when the aggregate total of data segments in the storage does not equal or exceed the threshold, creation of the full disk image of the backup is omitted.

17. The non-transitory computer readable storage medium as recited in claim 14, wherein when a problem occurs with a production VM, the disaster recovery engine instantiates a recovery VM, and the recovery VM includes the recovery disk.

18. The non-transitory computer readable storage medium as recited in claim 14, wherein when a disaster recovery request is received by the system for a production site VM, and a full disk backup does not exist for a disk of the production site VM, the disaster recovery engine attaches, to a recovery VM, a full disk image of the VM disk that is closest to the point in time that is to be restored.

19. The non-transitory computer readable storage medium as recited in in claim 18, wherein one or more incremental changes are written to, or undone from, the full disk image attached to the recovery VM.

20. The non-transitory computer readable storage medium as recited in in claim 14, wherein the target disaster recovery time is specified by a customer service level agreement.

\* \* \* \* \*